(12) United States Patent
Haverkamp et al.

(10) Patent No.: US 12,450,568 B1
(45) Date of Patent: Oct. 21, 2025

(54) ONBOARDING IDENTIFIER FOR BLOCKCHAIN

(71) Applicant: TrueBlue, Inc., Tacoma, WA (US)

(72) Inventors: Meishelle Lynn Haverkamp, Gulfport, FL (US); Cindi Kathleen Knutson, Lake Tapps, WA (US); Christopher Edward Nelson, Puyallup, WA (US); Lisa Harris, Tacoma, WA (US)

(73) Assignee: TrueBlue, Inc., Tacoma, WA (US)

( * ) Notice: Subject to any disclaimer, the term of this patent is extended or adjusted under 35 U.S.C. 154(b) by 154 days.

(21) Appl. No.: 18/073,444

(22) Filed: Dec. 1, 2022

(51) Int. Cl.
*G06Q 10/1091* (2023.01)
*G06Q 20/10* (2012.01)
*H04L 9/32* (2006.01)

(52) U.S. Cl.
CPC ....... *G06Q 10/1091* (2013.01); *G06Q 20/102* (2013.01); *H04L 9/3218* (2013.01); *G06Q 2220/00* (2013.01)

(58) Field of Classification Search
CPC ............. G06Q 10/1091; G06Q 20/102; G06Q 2220/00; H04L 9/3218
USPC ......................................................... 705/32
See application file for complete search history.

(56) References Cited

U.S. PATENT DOCUMENTS

| | | | |
|---|---|---|---|
| 2018/0322588 A1* | 11/2018 | Linne | G06Q 40/125 |
| 2020/0098072 A1* | 3/2020 | Escobar | G06Q 10/06 |
| 2020/0169425 A1* | 5/2020 | Hofstee | H04L 9/0861 |
| 2023/0136446 A1* | 5/2023 | Burchard | H04L 9/50 713/155 |

OTHER PUBLICATIONS

Alfaidi, Arij. Multi Authority Pairing Attribute Based Chameleon Hash Consensus (MAP-ABCH) Protocol and RTBF-Blockchain Graphs toward Private and Secure mHealth System. University of Colorado Colorado Springs ProQuest Dissertations & Theses, 2022. (Year: 2022).*
Unknown. Method and System for Intelligent Workflows Utilizing Talent Management and Reskilling Human Capitol. Ip.com Prior Art Database. Jan. 5, 2022. (Year: 2022).*
Kanciak, Krzystof et al. Secure Onboarding and Key Management in Federated IoT Environments. 2022 17th Conference on Computer Science and Intelligence Systems (FedCSIS), 2022. (Year: 2022).*
U.S. Appl. No. 18/073,369, filed Dec. 1, 2022, Unique Timecard Identifier for Blockchain.
Non-Final Office Action in U.S. Appl. No. 18/073,369 mailed Nov. 5, 2025, filed Dec. 1, 2022, Unique Timecard Identifier for Blockchain, 15 pages.
Final Office Action in U.S. Appl. No. 18/073,369 mailed Feb. 18, 2025, iled Dec. 1, 2022, Unique Timecard Identifier for Blockchain, 15 pages.
Notice of Allowance mailed May 5, 2025 in U.S. Appl. No. 18/073,369, Unique Timecard Identifier for Blockchain, 18 pages.

(Continued)

*Primary Examiner* — Fawaad Haider
(74) *Attorney, Agent, or Firm* — Evolve Patent Law Group PLLC

(57) ABSTRACT

Apparatuses, systems, and methods described include receiving by a node in a blockchain, a unique timecard identifier including an onboarding identifier to trigger an action in a smart contract related to a worker's identity. In embodiments, verification of identification documents and work history of a worker associated with the unique timecard identifier, is triggered.

18 Claims, 8 Drawing Sheets

(56) References Cited

OTHER PUBLICATIONS

Unknown, Method and System for Intelligent workflows Utilizing Tenant Management and Reskilling Human Capital. Ip.com. prior art database. Jan. 5, 2022. (Year: 2022).

Zakir, Yusuf, Improving Aviation Data Communication and Storage Security using Blockchain Based Approach. University of Houston—Clear Lake Proquest Dissertations and Theses, 2020. (Year: 2020).

\* cited by examiner

ONBOARDING IDENTIFIER FOR BLOCKCHAIN

TECHNICAL FIELD

This disclosure relates generally to blockchain transactions, and in particular to an identifier associated with triggering an onboarding transaction for a worker.

BACKGROUND INFORMATION

Blockchain is a shared, distributed ledger that is supported by a network of geographically distributed nodes. The nodes prevent tampering through redundancy, encryptions, and hashing and reach an agreement on the network's current state via different consensus algorithms. Once a new block is added to the chain, it is computationally costly to change the block's data and almost impossible to do so as new blocks are added to the chain.

Public blockchains typically allow full access and participation by any party. For example, any party that can perform or meet relevant proof-of-work (PoW) or proof-of-stake (PoS) requirements can operate a node on the blockchain, e.g., Ethereum. In contrast, a private blockchain typically includes only one or two main entities which control the network and allow selected users access or participation. A hybrid blockchain may include both public and private blockchain properties and may be similar to a permissioned blockchain, which allows certain participants to join or access the network after a party is properly verified. A consortium blockchain may allow access by a particular group of organizations and be similar to a hybrid or permissioned blockchain. A consortium blockchain may have additional characteristics such as a configuration where participants have similar/equal power in the network.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
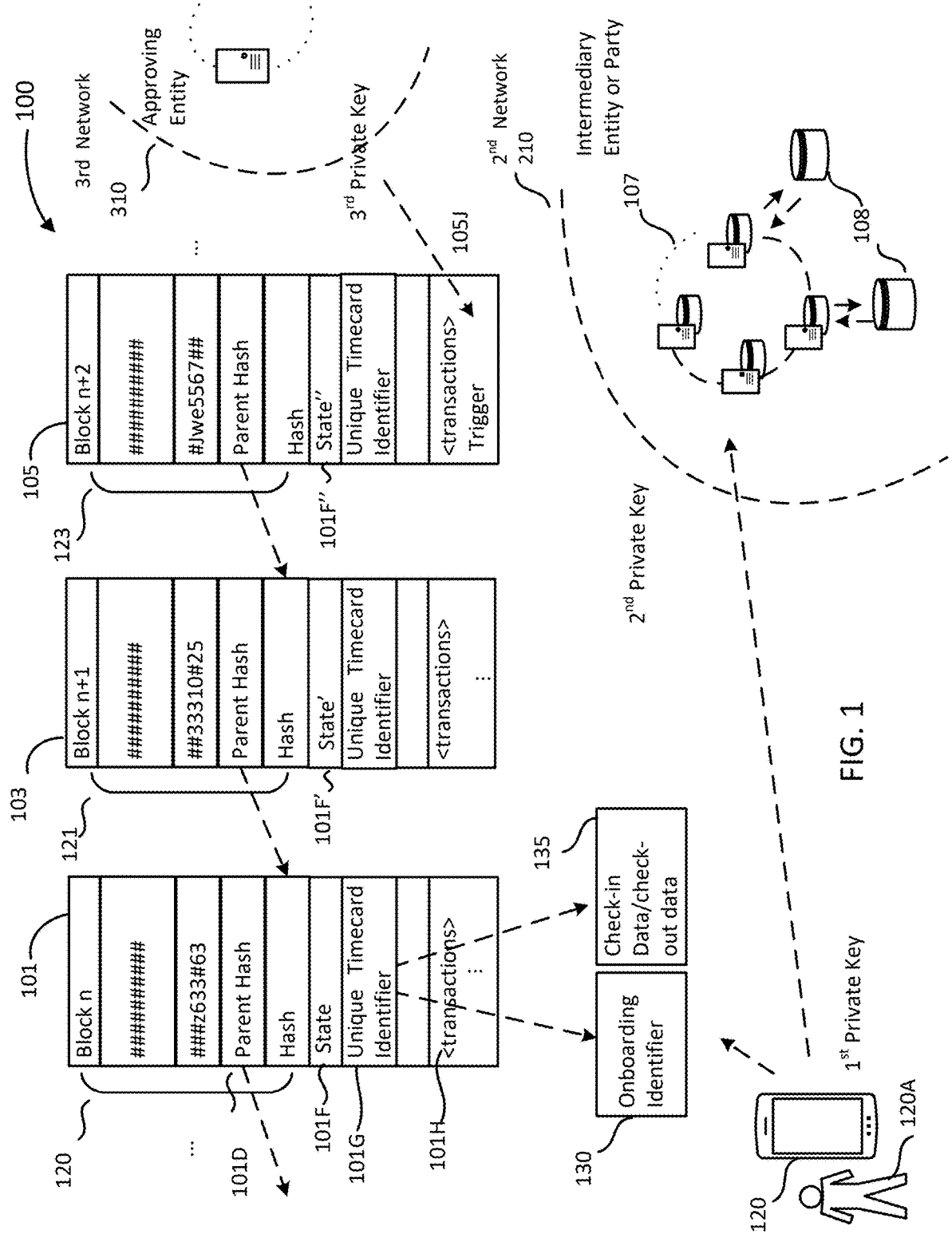
FIG. 1 illustrates an example environment including a blockchain including a unique timecard identifier including an onboarding identifier and check-in and check-out data, in accordance with embodiments of the disclosure.

Embodiments of systems and methods for generation of a unique timecard identifier for blockchain is described herein. In embodiments, a worker onboarding identifier for blockchain is generated as part of the timecard identifier. In some embodiments, an edge network coupled to the blockchain is triggered to process a plurality of computations related to a parameter that is to be returned in order to trigger an authorization related to the unique timecard identifier. In other embodiments, the computations are performed on the blockchain or a portion are performed off the blockchain dependent upon the nature of the computation. In embodiments, the unique timecard identifier includes an onboarding identifier and check-in or check-out data. In some embodiments, the check-in or check-out data conveys a geographic location and a check-in time or check-out time for a user and a trigger authorizes a transaction for the user.

In embodiments, the unique timecard identifier coupled with a receipt of parameters from the edge network allows for secure and an instant approval for a transaction without incurring the high processing power and latency associated with computations on the blockchain. Note that edge computing is a computing framework where the processing and storing of data occurs closer to where the data is generated. This framework allows processing and response that is closer to real time.

In additional embodiments, the blockchain includes a consortium blockchain and the data is stored and processed within the consortium blockchain with limited input from an edge network. In some embodiments, the only input from an external party may be from an oracle to receive the unique timecard identifier from a worker and/or additional verification of his or her identity and check-in or check-out data. These and other embodiments are described in detail below with respect to FIGS. 1-7.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

FIG. 1 illustrates an example environment including a portion of example blockchain 100 ("blockchain 100") including a unique timecard identifier 101G including an onboarding identifier 130 and check-in and/or check-out data 135, in accordance with embodiments of the disclosure. As shown, example environment includes, blockchain 100 included in a first network. The example environment further includes a second network 210, a third network 310, and a mobile device 120 associated with a worker or user 120A.

Figure 2:
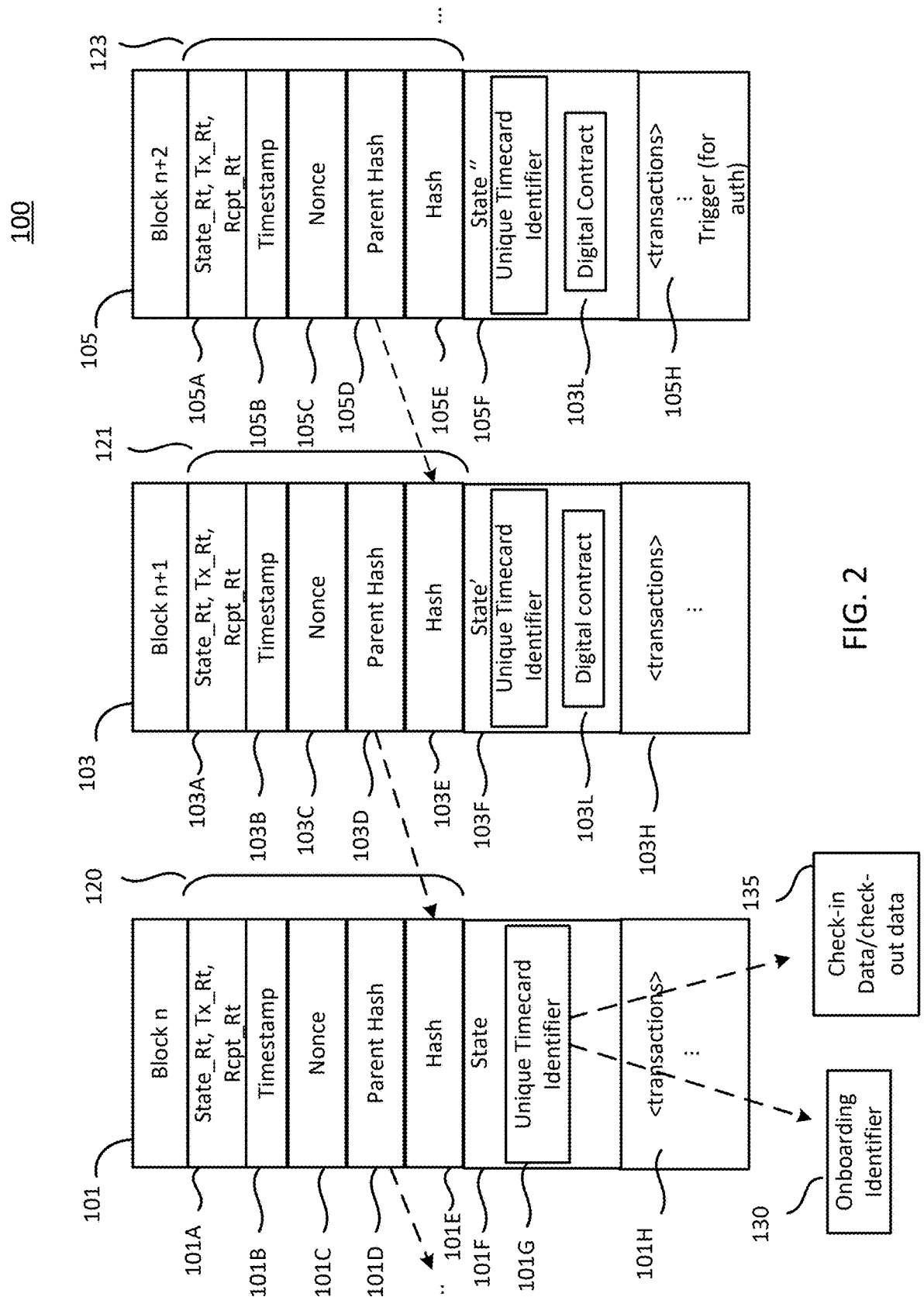
FIG. 2 is a block diagram illustrating the blockchain of FIG. 1, in more details, according to embodiments of the disclosure.

In FIG. 1, portion of blockchain 100 includes three simplified blocks 101, 103, and 105 having respective headers 120, 121, and 123, including block elements such as for example but not limited to, a nonce number, parent hash, hash, etc., (to be discussed in more detail with respect to FIG. 2). Transactions 101H include a plurality of transaction values on the blockchain. In some embodiments, second network 110 is an edge network coupled to blockchain 100 and is triggered to process a plurality of computations related to a parameter.

In embodiments, state values 101F-101F" include a set of entries representing a state of a digital contract that requires the parameter for execution and is associated with unique timecard identifier 101G in blockchain 100. In embodiments, the digital contract is a computerized transaction protocol. In examples, the set of entries include entries associated with a first public key related to a first account, a second public key associated related to a second account, and a third public key associated with a third account. In embodiments, the first account is associated with a user or worker (e.g., 120A), the second account is associated with an intermediary entity or party (e.g., a staffing entity) that may control a plurality of computing devices 107 and databases 108 of e.g., an edge network, and the third account is associated with an approving entity (e.g., client or customer of staffing entity) to trigger transfer of an authorization value (e.g., payment amount) to the worker. In some embodiments, for added security, the second and/or third private key which approves final transfer of value to worker 120A may be generated by a distributed private key process. In various embodiments, instant payment is made through a paycard vendor, such as, e.g., GCC GLOBAL CASH CARD®, WISELY®, and the like.

Note that an account can refer to an externally owned account (directly associated with a user or entity) or a contract account.

Note that public key cryptography may be used to create the public-private key pair. In embodiments, the private key controls access by being able to create a digital signature to authenticate the owners or users of the digital contract.

In some embodiments, blockchain 100 (and the blockchains of below FIGS. 1-4) is a permissioned or consortium blockchain. In a consortium blockchain, for example, each member is typically a private company or organization without one centralized member controlling or manipulating information on the blockchain. In some embodiments, (not shown) blockchain 100 includes the intermediary entity and the approving entity. In embodiments, the consortium blockchain may include members such as both employers and staffing companies in order to keep sensitive information about the worker as well as payments, secure. Performance and other work history information related to the worker can also be provided to consortium blockchain by the actual employer. In embodiments, the second and third networks may include edge networks or be included in a consortium or other blockchain of blockchain 100.

FIG. 2 illustrates the example blockchain of FIG. 1 in further detail, in accordance with embodiments of the disclosure. In FIG. 2, blocks 101, 103 and 105 include respective headers 120, 121, and 123 and may include but not be limited to, for example Merkle Tree Roots (e.g., Patricia trees) such as a State Root (State_Rt), Transaction Root (Tx_Rt), and Receipt Root (Rcpt_Rt), e.g., 101A, 103A, 105A. In the embodiments, headers 120, 121, and 123 also include a timestamp (e.g., respective 101B, 103B, 105B), nonce number (e.g., 101C, 103C, 105C), and hash of a previous block, parent hash (e.g., 101D, 103D, 105D).

In embodiments, state values (e.g., 101F-101F") may be associated with a set of entries representing a state of a digital contract 103L in the blockchain network. In embodiments, the state values may include a state of digital contract 103L as altered by receipt of a unique timecard identifier. Transactions 101H-105H represent a plurality of transaction values on the blockchain. Note that each transaction may represent a cryptographically signed instruction (for an action) from an account.

Accordingly, in embodiments, a method may include receiving, by a communications interface of a computing device (e.g., FIG. 7), a unique timecard identifier, e.g., 101G, that includes an onboarding identifier 130 and check-in or check-out data 135. In some embodiments, the computing device may generate a new transaction value that includes at least an authorization value and/or trigger 105J for a payment of the authorization value calculated based on the unique timecard identifier 101G. In some embodiments, the computing device may generate a new entry into a smart or digital contract based on information received in the unique timecard identifier 101G. In some embodiments, the new entry is related to a calculation made related to the payment of the authorization value (e.g., payroll amount calculated for a single day's wage determined according to all deductions, bonuses, and the like) and/or a receipt of a parameter needed for the calculation. Note that calculation of a single days' wage for a W2 employee according to all deductions, bonuses is typically rare or nonexistent as payroll is typically calculated in terms of a longer time period—a week or two weeks' time period. For example, to grant an employee pay for a single day, typically, only a certain amount is available to that employee as an advance on a total amount determined/calculated at a later time.

In embodiments, the unique timecard identifier 101G represents or is a secure combination of an onboarding identifier and check-in and/or check-out data. In some embodiments, the unique timecard identifier is a hash of onboarding identifier 130 and the check-in and/or check-out data 135.

In some embodiments and as will be discussed in more detail below, unique onboarding identifier 130 verifies a user's identity. In some embodiments, onboarding identifier 130 includes information that is associated with verified information minted on the blockchain related to a user's (or worker's) EVERIFY™ information, W4, 1-9, as well as licenses and certificates. In various embodiments, an onboarding identifier can be utilized separately from a unique timecard identifier 101G which may be associated with a particular shift.

In embodiments, the computing device may hash the header included in a previous block identified by the timestamp, to generate a new header with a new timestamp. The computing device may also hash, by the computing device, at least the authorization value to generate a new hash value and generate a next block including at least the new header and the new hash value. The computing device may electronically transmit the next block including at least the new header and the new hash value based on at least the unique timecard identifier to a node of the blockchain network to add the generated new block to the blockchain. In embodiments, the authorization value is an amount to be paid to a user and is secure from modification as it is embedded in the blockchain.

Note that in embodiments, the check-in data and check-out data conveys a check-in time or check-out time for a user at a respective geographical location of a worksite and as noted above, the onboarding identifier is a secured identity of a user arriving or leaving a site. In some embodiments, a value of the check-in or the check-out data is triggered in part by a geofencing location of a mobile phone of the user. In some embodiments, an autonomous vehicle sensor conveys the information automatically.

In embodiments, once the blockchain receives unique onboarding identifier 130 from the worker, the information associated with the identifier is confirmed by the smart contract against known information associated with the worker and job site. For example, the geographic and timing information is verified against information in a database (e.g., see FIG. 5) or in the blockchain confirming where and when the worker was expected. Furthermore, the smart contract may trigger an action by an oracle to contact a device associated with a supervisor or device at the job site to confirm the worker's identity and timing.

As noted briefly above, receipt of the check-in time may cause the computing device to generate a digital contract associated with the unique timecard identifier. As will be discussed in connection with FIG. 5, in embodiments, the digital contract is to execute specific contract conditions related to deductions and supplements and associated with the unique timecard identifier.

Figure 3:
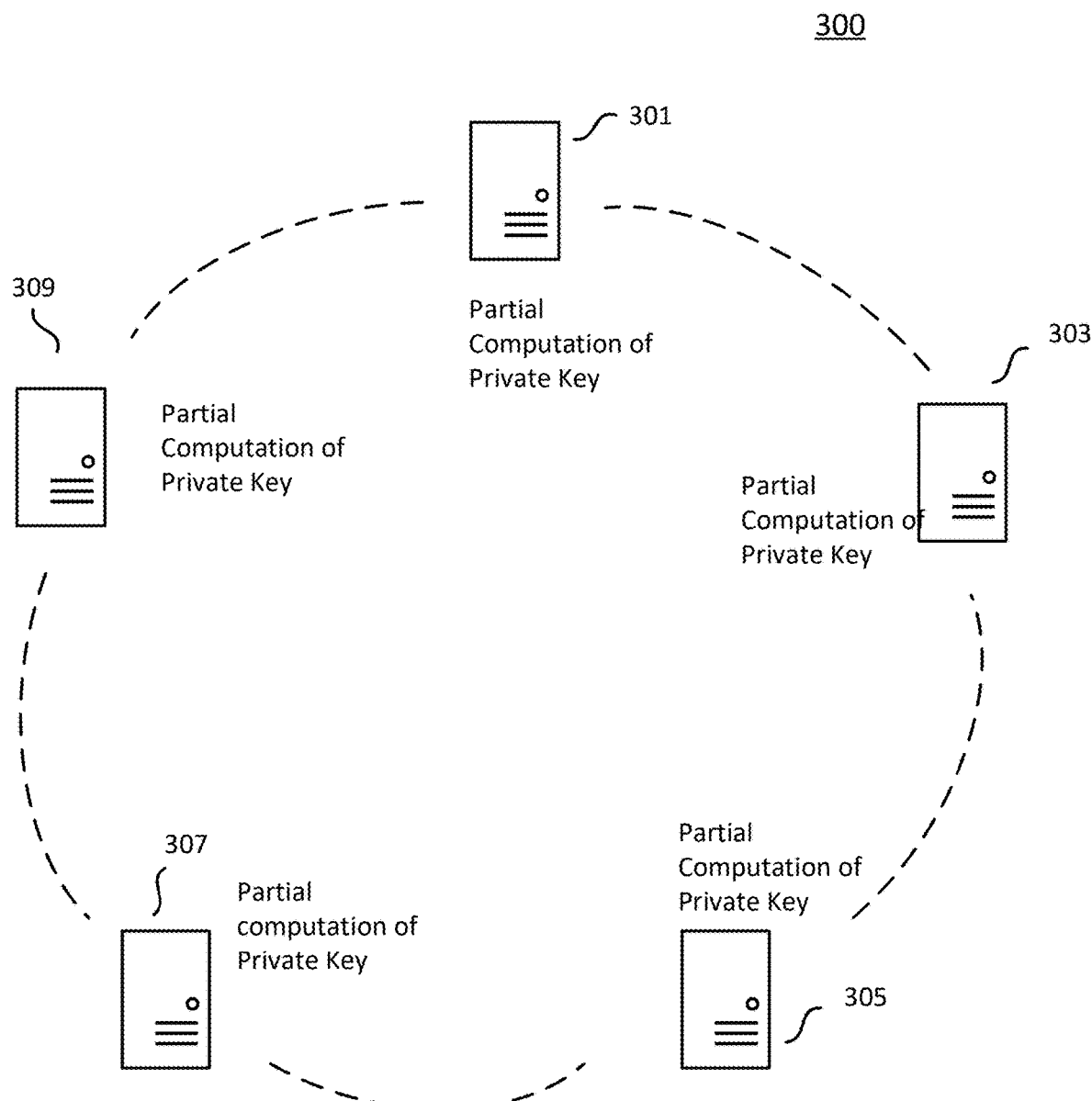
FIG. 3 is a block diagram illustrating an embodiment associated with approval/transfer of value to the user via distributed private key, in accordance with embodiments of the disclosure.

FIG. 3 is a block diagram illustrating an embodiment associated with approval/transfer of the authorization value to a user/worker. In various embodiments, network 300 may be part of a public blockchain, a hybrid blockchain (public and private), or a consortium blockchain. In embodiments, a plurality of computing nodes ("nodes") 301, 303, 305, 307, and 309 (it is understood that only a few example nodes have been shown for simplicity) each perform a partial computation of a private key required to approve payment. As touched upon in FIG. 1, in aspects, a first account is associated with a user, a second account is associated with an intermediary entity party, and a third account is associated with an approving entity to trigger transfer of a calculated authorization value to a worker. In embodiments, the third account is associated with a distributed private key, wherein the plurality of nodes (e.g., 301-309) generates the key pair using partial computations performed by each of multiple parties to enable the third account to securely approve the transfer of the authorization value to the user. In some embodiments, all accounts are associated with a distributed private key to secure identity and calculated amounts associated with payment. In embodiments, note that the authorization value is a payment value that has been calculated to compensate the worker instantly, with all deductions and payroll determined for instant payment of a daily wage. In embodiments, note that the daily wage is not merely an estimate or an advance of a user's paycheck but an accurate payroll amount calculated to the hour or minute owed to the worker with all appropriate deductions and credits applied.

In embodiments, the intermediary party may be an entity that serves as a go-between between the approving party and the user (worker) such as, e.g., a staffing company or entity or W2 employer. In other embodiments, the intermediary party and the approving party are the same entity.

Figure 4:
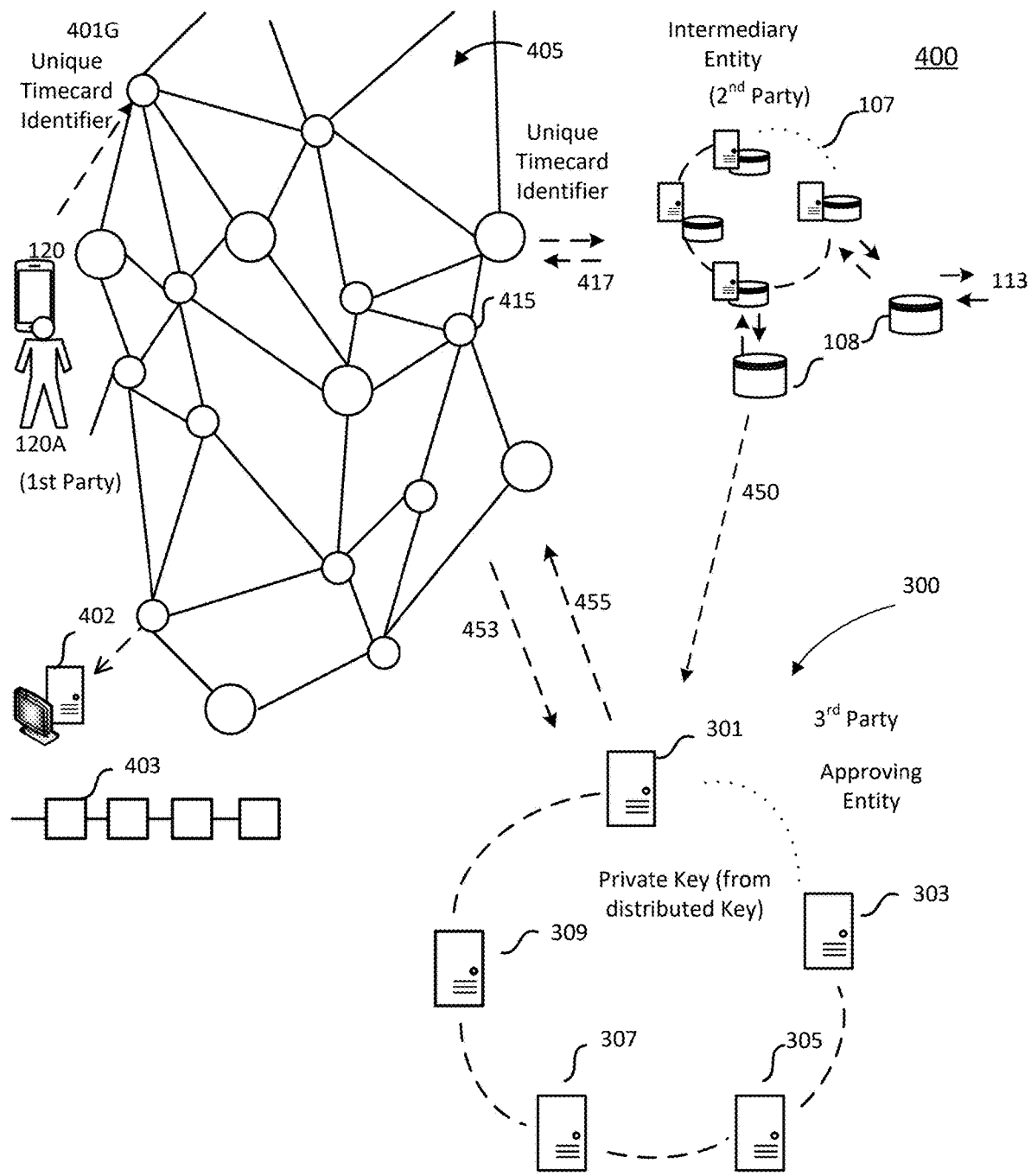
FIG. 4 is an environment including a blockchain network that may be coupled to one or more edge networks, in accordance with embodiments of the disclosure.

FIG. 4 is an environment 400 including a blockchain network 405 that may be coupled to one or more edge networks and/or is included in a hybrid or consortium blockchain network, according to embodiments of the disclosure. FIG. 4 assists in illustrating a flow related to the unique timecard identifier and calculation and subsequent approval of an authorization amount. In embodiments, a user 120A may check-in via their mobile phone (e.g., via an app or automatic geofence sensor) at a geographic job site or worksite at, e.g., 7:05 am. A unique timecard identifier 401G (similar or the same as 101G of FIG. 1) may be generated or retrieved (e.g., via the app) that securely identifies user 120 via onboarding identifier (e.g., 130 of FIG. 1) as well as includes check-in data (e.g., 135 of FIG. 1). In embodiments, a computing device 402 included in a plurality of nodes (only one node is labeled at 415, for clarity in the FIGS.) of blockchain network 405 validates the unique timecard identifier 401 and records the unique timecard identifier 401 in a new block (e.g., 403). In some embodiments, the unique timecard identifier 401G may trigger a digital contract or a plurality of digital contracts to be generated. In embodiments, once the conditions of the digital contract are fulfilled, the user may be instantly paid an authorization amount consistent with all payroll calculations for a single day's work automatically and securely.

For example, the digital contract may receive a check-out time submitted by user 418 (e.g., 5:00 pm) from the geographic location of a job site/worksite. At arrows 417, the unique timecard identifier including a check-out and check-in time is then received by a second party (e.g., intermediary) from blockchain 405 at a second network 107 associated with the intermediary entity. In embodiments, the second network is an edge network or a hybrid or consortium blockchain (including computing devices and databases 107) that may calculate a substantially final value or payment amount based on the onboarding identifier and the check-in and check-out data. In embodiments, the calculation includes determining a rate based on identification of the user and hours based on the check-in and check-out data to calculate an amount including deductions or additions related to jurisdictional rules retrieved from a computing device or database e.g., 108. In some embodiments, where the calculations occur on the blockchain (via the smart contract), updated and applicable jurisdictional rules and rates may be received from an oracle coupled to an edge network.

In some embodiments, the second network 107 serves as a blockchain oracle to provide a parameter (e.g., the substantially final payment amount or other) to the blockchain based on the unique timecard identifier. Note that a blockchain oracle can be defined as a device, entity, or third-party service that connects the blockchain with the external world and vice-versa in order to provide data or receive data. In order to avoid a single point of failure, note that as described below, the approval or final authorization of the payment amount is verified via a distributed private key. Furthermore, in various embodiments, another safeguard includes a range of a payment amount built into the smart contract based at least in part upon guidelines for the job site, worker, and daily pay threshold.

In some embodiments, the final amount or payment amount is provided as a final parameter back to the digital contract. Once the condition of receiving the payment amount is fulfilled, then the amount is sent directly at 450 (or in some cases 455) to be approved by the third or approving party or entity at, e.g., 450 or 453. In embodiments, network 300 (e.g., also of FIG. 3) assists in calculating a distributed private key to accompany authorization of the payment amount. In some embodiments, a range of an amount that can be approved for payment is included in the digital contract as a check on an amount that can be approved.

In various embodiments, in the case of a dispute regarding timecard check-in/check-out (e.g., the worker provides hours worked, and the customer disagrees) and/or other inconsistency, there may be a rejection of the request for payment by the approving party (intermediary party or $3^{rd}$ party, customer). In some embodiments, a notification for a rejected transaction may be provided to the intermediary party (e.g., staffing agency or company) if they were not the rejecting party. The notified party may reprocess or investigate the inconsistency and if cleared, optionally approve the payment.

Note that a hybrid blockchain can be defined as a combination of a public blockchain and private blockchain. In embodiments, the blockchain can be similar to, e.g., HYPERLEDGER® Fabric platform or other blockchain having permissions determined by a set of policies agreed to by an entity or consortium as initially configured. For example, in some embodiments, the first, second and third network may together form a hybrid or consortium blockchain for added security as well as efficiency in performing autopay calculations. In some embodiments, certain parameters and algorithms required to complete the smart contract conditions (as described below) can be securely computed on a private and/or consortium blockchain which can also be connected with a government channel.

Thus, as noted above, in various embodiments, a consortium blockchain may include each of blockchain 405, as well as nodes operated by the intermediary entity and approving third party and may include network 107 and the network 300 (rather than the latter networks being wholly edge networks).

Figure 5:
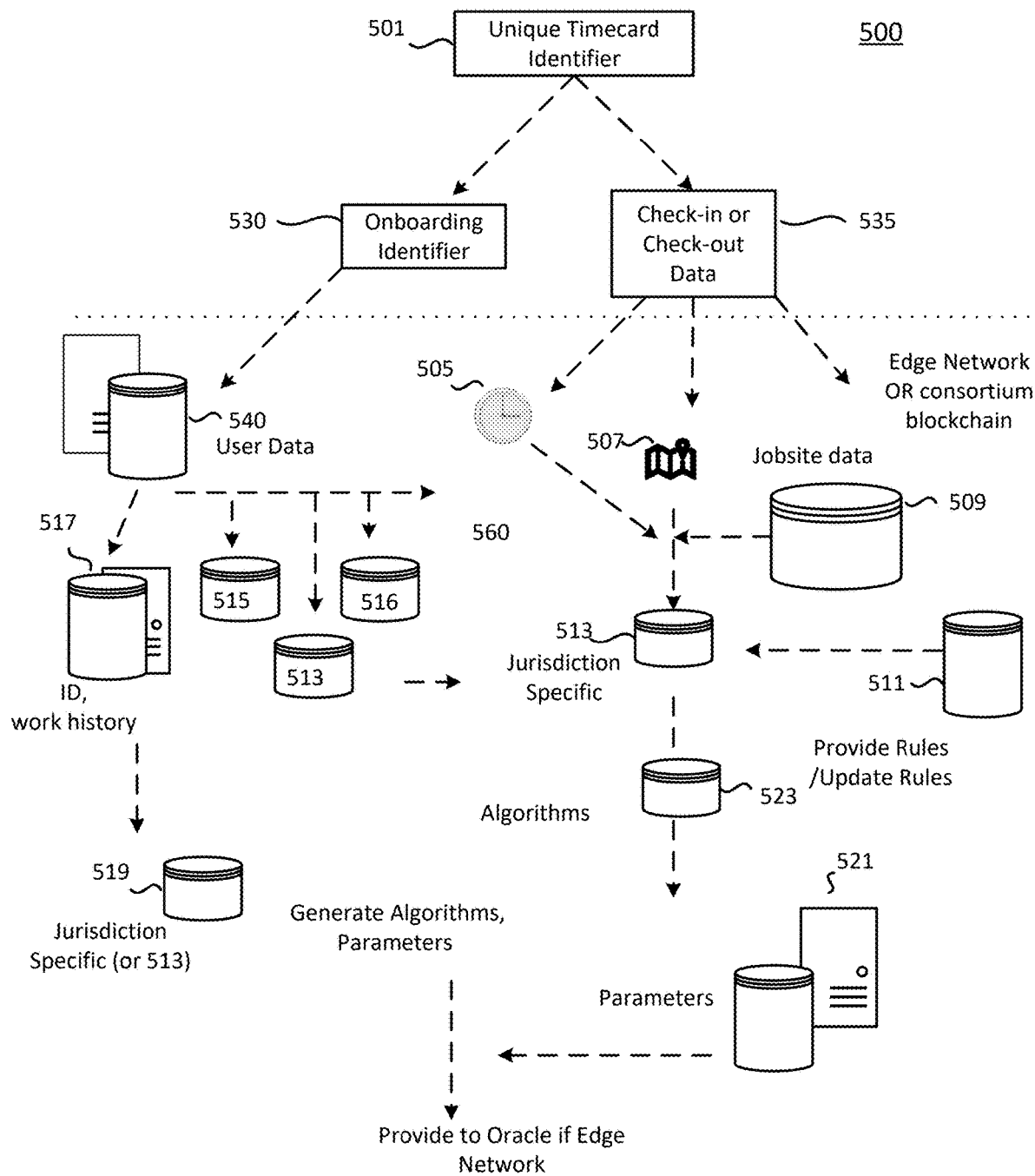
FIG. 5 is a block diagram, to further illustrate the unique timecard identifier, in accordance with embodiments of the disclosure.

FIG. 5 is a block diagram that further illustrates the unique timecard identifier of FIGS. 1-4, according to embodiments. As discussed previously, a unique timecard identifier 501 includes two components, onboarding identifier 530 and check-in or check-out data 535. In embodiments, unique timecard identifier 501 allows the blockchain to securely identify a worker as well as confirm data related to the check-in and/or check-out data. As a result, a digital contract on the blockchain can receive an authorization and trigger a payment value calculated based on the unique timecard identifier.

In embodiments, onboarding identifier 530 is associated with user data 540. In some embodiments, user data 540 is cryptographically stored and minted on the blockchain. In other embodiments, user data 540 is stored in an edge network (e.g., edge network 107) or private network, e.g., of an intermediary organization.

In embodiments, the onboarding identifier verifies a user's identity. As noted above, in some embodiments, the onboarding identifier includes information that is associated with verified information related to a user's (or worker's) EVERIFY™ information, W4, 1-9, as well as licenses and certificates. In various embodiments, this onboarding identifier can be utilized separately from the timecard identifier which may be associated with a particular shift. In various embodiments, the onboarding identifier 530 can be used by a worker in transactions unrelated to receiving payment for a shift.

In various embodiments, the onboarding identifier 530 may be used to onboard himself or herself for other identification purposes, such as applying for or onboarding for other employment. In various embodiments, the user/worker has individually or through an organization (e.g., intermediary organization noted above or previous or current employer) previously verified his or her identification documents or cryptographically minted the identification documents to the blockchain. In embodiments, the user/worker has connected the onboarding identifier to his or her personal device and his or her identity. In embodiments, prior to taking instant payment for the day's wage, the worker's identity is verified based at least in part on a zero-knowledge proof provided by the worker. For example, the smart contract may include a hashed value provided by the worker or the intermediary entity. Only the worker has the digital private key included in the onboarding identifier which can unlock his or her identity. In other examples, the worker can answer a question which does not reveal other information which may compromise the security of the transaction.

In some embodiments, user data 540 may be further linked with work history of the worker 517 (e.g., verified experience, that in some cases may also be pulled from the blockchain) as well as tax status and other related information. In some embodiments, if the blockchain is a consortium blockchain, various employers may have supplied and verified the worker's history including performance history.

In embodiments, additional data needed by edge network or the blockchain to calculate a daily wage or other amount the worker is owed, may be stored at 515. For example, additional data about the worker may be stored, such as whether supplemental pay may apply. If needed, the additional data may be linked to jurisdiction specific data stored that is related to tax rates and supplemental pay rules. The information may then be merged with the check-in/check-out data to generate algorithms and parameters required to calculate an authorized payroll amount to be instantly dispensed to the worker as a daily wage. In embodiments, the worker is a W2 worker, not a contractor who takes 1099 payment.

For example, check-in/check-out data 535 includes a respective time 505 that a worker has checked-in and checked-out from the job site 507. In some embodiments, as noted previously, the information includes geographic information received from a mobile device of the worker. In some embodiments, the geographic information may be received from sensors or circuits that automatically transmit a location of an autonomous vehicle or machinery that the worker operates. For example, various machinery may include heavy machinery used on construction sites. Operation of the machinery can also be recorded and associated with the worker such that relevant hours of experience can be recorded for future employer reference. The check-in/check-out data 535 (and/or in conjunction with the onboarding identifier 530) can enable identification by an edge or other network of a location where job site check-in/check-out data 535 is stored.

In some embodiments, check-in/check-out data 535 is combined with previous check-in/check-out data stored at 509 to identify whether the worker has worked at multiple job sites that day or that week and whether the payment rules to be applied translate to multiple jurisdictions. Based on geography and time of check-out, an algorithm may be generated to determine whether overtime thresholds have been reached. In addition, various pay rates may be determined such as a correct overtime pay rate for the current day. Furthermore, it may be determined that overtime/double time (OT/DT) applies. In some embodiments, the rules may be retrieved from a database which is updated with rules for different states. In embodiments, the database itself has a separate network connection to outside agencies (e.g., government or third party) which update rules and data in real time. In some embodiments, once hours have been segregated, the correct rates can be retrieved and applied to determine the correct gross pay.

Databases 513, 515, and 516 which include additional data about the worker may indicate whether garnishments apply. Database 515 may include data related to the relevant agencies, orders, deductions, etc. Using this information, the correct algorithms for the correct jurisdictions related to where a worker lives and works can be generated or retrieved.

Note that in embodiments, minimum wage may be enforced. For example, many jurisdictions (e.g., city, county, and state) have passed minimum wage requirements. The system may receive the geographical information from the job site and determine the applicable minimum wage for the worker's time frame. In embodiments, if the system attempts to pay below minimum wage the system may stop and not allow the automatic payment to proceed until it is corrected. Note that due to overtime segregation and minimum wage enforcement rules, the system may allow database entries and corrections in the week worked by the worker. As a result, all overtime segregation, regular rate of pay, per diem, and minimum wage enforcement rules are used for the correct time frame.

In addition, it can be determined if the worker has worked at a prevailing wage job site. Relevant pay rates are determined and applied. In embodiments, current prevailing wage information can be pulled from a remote database associated with a governmental agency. Note that "prevailing wage" may refer to an average wage paid to similarly employed workers in a particular occupation in an area of employment. Certain jurisdictions may have laws requiring employees to pay their employees the prevailing wage.

As noted above, workers may work at multiple job sites per day or week. In embodiments, some of such job sites are subject to federal or state prevailing wage laws. For jobs subject to such requirements, there are distinct components of pay that are required:

i. Base pay rate—subject to overtime
ii. Benefit pay rates (fringes)—are not subject to overtime In embodiments, the method is designed to properly calculate overtime pay rates based on a pay rate category. Additionally, programming may be customized to include or exclude non-prevailing wage job sites from prevailing wage job sites to properly calculate a regular rate of pay. Note that, prevailing wage job sites may be subject to special overtime rules depending on location of a job site. For example, work performed on federal job sites follow federal overtime laws, not state specific laws. The method may be designed to recognize if a job site is a federal and properly calculate overtime. Accordingly, as noted previously, database 519 may store jurisdiction specific information that applies to where the worker resides or works (or where the employer is located). Database 519 may be connected to outside sources relative to the intermediary network. Thus, updated prevailing wage information can be instantly applied to the calculation for the worker's daily wage. Note that the arrangement of databases shown in FIG. 5 is merely an example and any appropriate configurations which expedite the method for instant approval of payment are possible.

Figure 6:
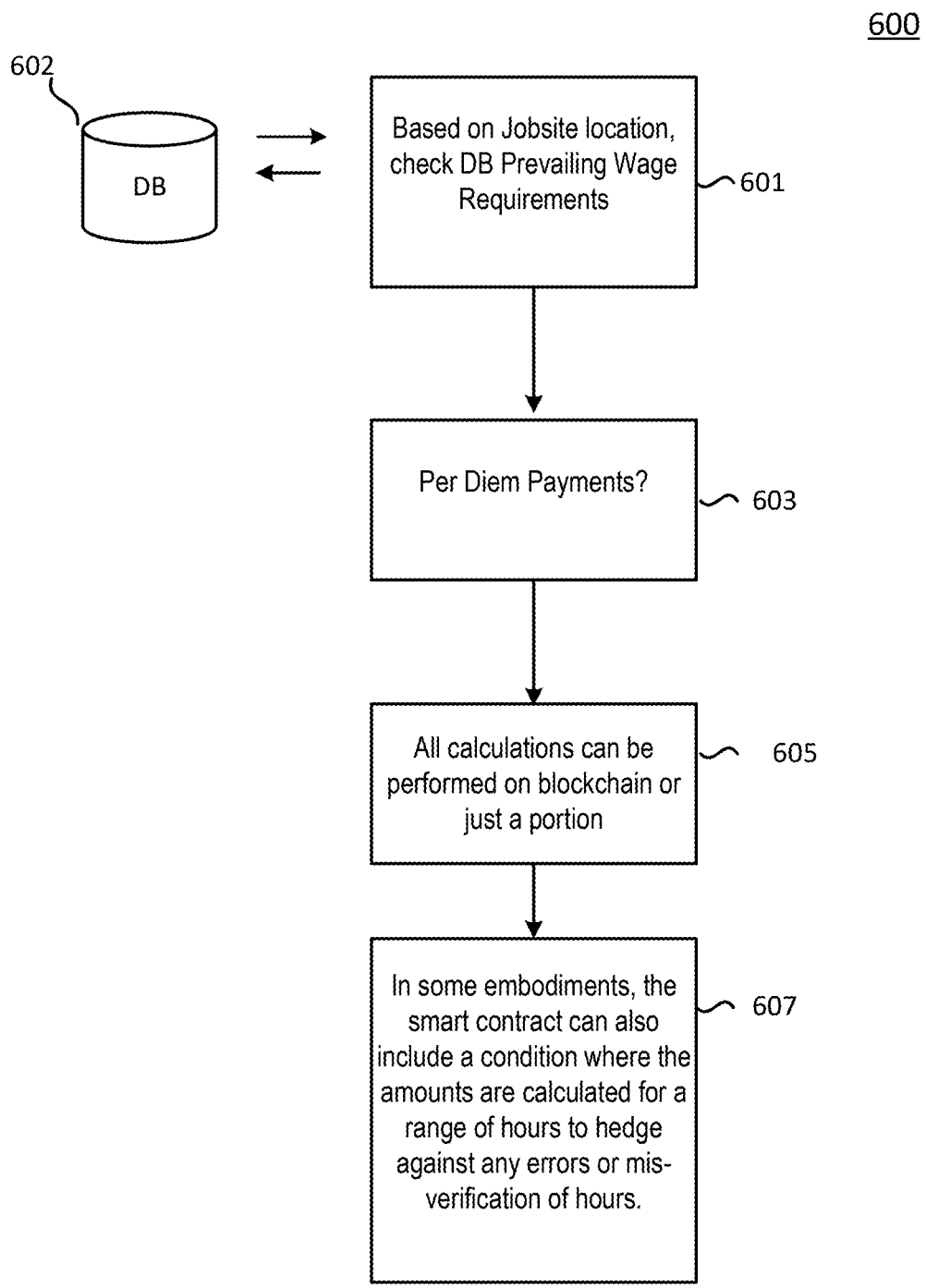
FIG. 6 is an example flow chart of a method 600 associated with aspects of FIGS. 1-5, in accordance with embodiments of the disclosure.

FIG. 6 is a flow chart that illustrates a method 600 associated with application of prevailing wage considerations. Beginning at a block 601, method 600 may check a database 602 (e.g., similar to or same as databases shown in FIG. 5) for applicable prevailing wage requirements based on received worker information and job site information. Next, in aspects, at a block 603, the method may determine whether per diem payments are applicable. Again, in embodiments, the determination may be based on the worker's information and a particular job site and/or previous amounts paid (whether via a typical payroll cycle or via a single day's wage instant payment via the blockchain). In some embodiments, the per diem payment question is replaced (or in addition) to any type of payment or deductions discussed below (e.g., supplemental payments, garnishments, and the like). In a next block 605, all calculations can be performed after the necessary algorithms are generated or retrieved. In embodiments, all calculations can be performed on the blockchain or just a portion, depending upon privacy, energy, or access requirements (e.g., split among the networks of FIG. 4 or all computed on a single consortium blockchain). In some embodiments, a location of where the calculations to be performed can be determined by a machine learning engine which balances efficiency and security/privacy considerations. In embodiments, a deployed smart contract can also include a condition where the amounts are calculated for a range of hours to hedge against any errors or breach of the identification system e.g., 607. Thus, the blockchain can approve/trigger instant payment to the worker with a limit on liability in the case of a security breach or miscalculation.

Tables 1 and 2 below are examples of various calculations that may be performed in connection with automatic payment to the worker. In some embodiments, the instant authorized payment amount can be based upon retroactive calculations based in part on payments already made (e.g., including void transactions) and that are to be corrected.

TABLE 1

| Scenario | Logic |
| --- | --- |
| Multiple pay rates | 1) Pay worker on one job with a pay rate of $13 for Monday (9/9) for 8 hrs.-should pay as 8 hrs. regular $104. |
| | 2) Pay worker on same job with a pay rate of $13 for Tuesday (9/10) for 10 hours-should pay as 10 hrs. regular $130 |

TABLE 1-continued

| Scenario | Logic |
|---|---|
| | 3) Pay worker on same job with a pay rate of $13 for Wednesday (9/11) for 10 hours-should pay as 10 hrs. regular $130 ==> ok<br>4) Pay worker on different job with a pay rate of $15 for Thursday (9/12) for 8 hours-should pay as 8 hrs. regular $120 ==> ok<br>5) Pay worker on the same job as #4 with a pay rate of $15 for Friday (9/13) for 8 hours-should pay as 4 hrs. regular-$60, 4 hrs. overtime-$87.45 |
| Multiple pay rates with complete void | 1) For the Payment above-For Tuesday payment, do a complete void of the payment. Add 3 hours at same pay rate $13, for a total of 13 hours worked for the day. Should pay as 10 hours regular-$130 and 3 hrs. overtime-$59.52. |
| Multiple pay rates with void/reissue | 1) For the Payment above-For Wednesday payment, do a void/reissue. Ensure that payment amount does not change, as we are only reissuing the payment under a new payment method. |
| Nondiscretionary bonus | 1) Pay worker on one job at a pay rate of $13 as follows (pay each day separately):<br>Monday for 8 hrs-should pay as 8 hrs. regular $104<br>Tuesday for 12 hrs-should pay as 12 hrs. regular $156<br>Wednesday for 8 hrs-should pay as 8 hrs. regular $104<br>Thursday for 8 hrs-should pay as 8 hrs. regular $104<br>Friday for 8 hrs for 8 hours with a nondiscretionary bonus of $100-should pay as 4 hrs. regular-$52, 4 hrs. overtime-$82.55 |
| Nondiscretionary bonus with void/reissue | 1) For the payment above (with nondiscretionary bonus), do a void reissue for Friday's payment.<br>2) Check the paystub-payment amount should not change, as we are only reissuing the payment under a new payment method. |
| Nondiscretionary bonus with complete void | 1) For the payment above (with nondiscretionary bonus), do a complete void for the bonus, and a complete void for Friday's hours<br>2) Reprocess the hours and exclude the bonus.<br>3) Overtime payment should change as follows:<br>4 hrs. regular-$52<br>4 hrs. overtime-$78 |
| Discretionary bonus | 1) Pay worker on one job at a pay rate of $13 as follows (pay each day separately):<br>Monday for 8 hrs.-should pay as 8 hrs. regular $104<br>Tuesday for 12 hours-should pay as 12 hrs. regular $156<br>Wednesday for 8 hours-should pay as 8 hrs. regular $104<br>Thursday for 8 hrs-should pay as 8 hrs. regular $104<br>Friday for 8 hours with a discretionary bonus of $100-should pay as 4 hrs. regular-$52, 4 hrs. overtime-$78 |
| Multiple pay rates and nondiscretionary bonus | 1) Pay worker on one job with a pay rate of $13 for Monday for 8 hrs.-should pay as 8 hrs. regular $104<br>2) Pay worker on same job with a pay rate of $13 for Tuesday for 12 hours-should pay as 12 hrs. regular $156<br>3) Pay worker on same job with a pay rate of $13 for Wednesday for 8 hours-should pay as 8 hrs. regular $104<br>4) Pay worker on different job with a pay rate of $15 for Thursday for 8 hours-should pay as 8 hrs. regular $120<br>5) Pay worker on the same job as #4 with a pay rate of $15 for Friday for 8 hours-and a nondiscretionary bonus of $500-should pay as 4 hrs. regular-$60, 4 hrs. overtime-$110.18 |
| Multiple pay rates and discretionary bonus | 1) Pay worker on one job with a pay rate of $13 for Monday for 8 hrs.-should pay as 8 hrs. regular $104<br>2) Pay worker on same job with a pay rate of $13 for Tuesday for 12 hours-should pay as 12 hrs. regular $156<br>3) Pay worker on same job with a pay rate of $13 for Wednesday for 8 hours-should pay as 8 hrs. regular $104<br>4) Pay worker on different job with a pay rate of $15 for Thursday for 8 hours-should pay as 8 hrs. regular $120<br>5) Pay worker on the same job as #4 with a pay rate of $15 for Friday for 8 hours-and a referral bonus of $500-should pay as 4 hrs. regular-$60, 4 hrs. overtime-$87.45 |

Table 2 provides example calculations relating to garnishments, child support, and IRS levies. In aspects, garnishments are calculated on a daily basis and garnishment order types can include bankruptcy, child support orders, creditor garnishments, IRS levies, state liens, and student loan debt. If a garnishment order has expired, which may occur when a total amount paid or expiration date has occurred, the system will apply the new calculation.

In aspects, child support values are calculated based on the lesser of a percent of disposable income or a weekly/monthly limit. In embodiments, to calculate child support deductions, weekly/monthly limits are converted into a daily limit. Additionally, in some embodiments, day-to-date balances, week to date, and month-to-date balances are tracked so that correct amounts are deducted for a single day, when a request is received. In embodiments, if a payroll payment (planned to be made or already made) is voided, applicable balances are dynamically updated so that a replacement calculation will deduct correct amounts.

In aspects, creditor garnishments are calculated based on a percent of disposable income or a weekly limit. In some embodiments, weekly limits may be defined as a particular amount (e.g., 30) multiplied by minimum wage. In order to calculate creditor garnishments correctly, the method may divide a weekly limit into a daily amount. In embodiments, garnishment information may be stored in databases of an edge network of a private consortium blockchain or in the private consortium blockchain itself.

In embodiments, parties may use the databases or decentralized storage of the blockchain as a data repository. In embodiments, a garnishment order may be stored in the data repository as well as an attachment or supporting data. Accordingly, an autopay system uses different algorithms to calculate the deduction, based on the garnishment order type, e.g., child support, creditor garnishment, or IRS levy. The autopay system may then use the following logic to create a payment:

1. Retrieve all deductions in the x days (with default=14)
2. Determine/check which have not been paid
3. Retrieve garnishment agency information for those that have not been paid.
4. Collate into payments
5. Save the payments to the database user-worker enters or exits an area defined by the geofence, a temporary platform may be enabled to track a location (e.g., via GPS associated with the mobile device, cellular triangulation, or IP tracing) of the user-worker's location.

Figure 7:
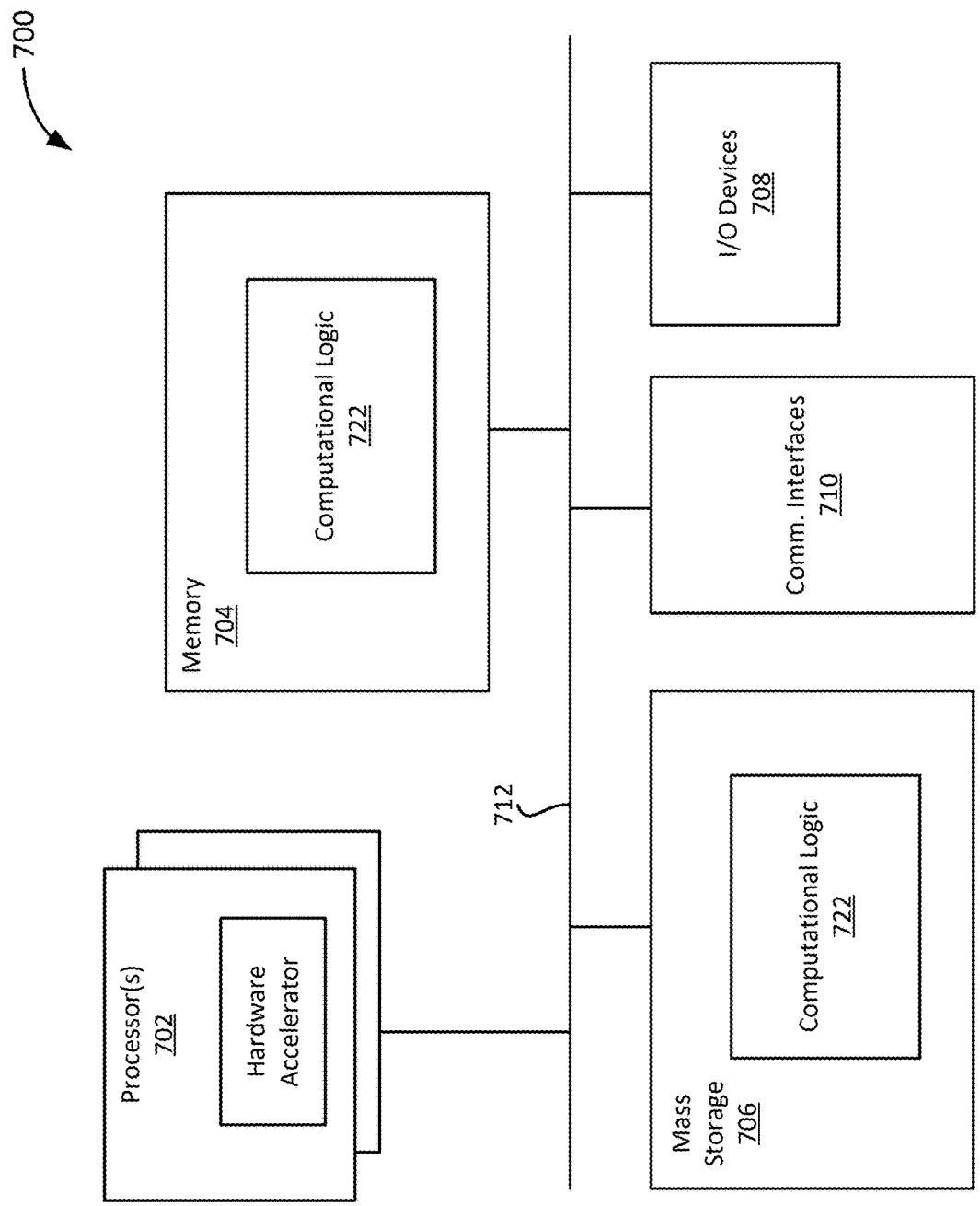
FIG. 7 is an example computing device, in accordance with embodiments of the disclosure.

FIG. 7 illustrates an example computing device 700 suitable for use with embodiments, such as described in connection with FIGS. 1-5 (e.g., the computing devices used as nodes in the blockchains and/or edge networks, and the like). The example blockchains as discussed in this disclosure may include computing nodes such as, e.g., computing device 700. A blockchain network has a distributed architecture where each node records data blocks including the same transactions. Each block cryptographically verifies their positions in the blockchain to enable the blockchain to maintain a distributed ledger maintained via a consensus mechanism. Note that a blockchain or blockchain data structure can be implemented by a peer-to-peer network following a protocol for verifying new blocks. Once the information has been included in a given block, the data

TABLE 2

| | |
|---|---|
| Child Support | 1) For a worker with tax elections of Single/0 and 0 allowances for IL: <br> 2) Pay worker for 10 hrs. for Monday-for a job rate at $22.50 per hour <br> 3) Gross $225, Fed WH $21.68, IL State WH $11.14, Soc Sec $13.95, Medicare $3.26 <br> 4) Garnishment deduction should be $50 (lessor of daily portion of weekly amount of $250, or 50% of disposable $87.49) <br> 5) Pay worker for Tuesday-Saturday in the same amount. The garnishment deduction should be the same each day except for Saturday, where we should get no deduction as we have met the weekly maximum. |
| Creditor | 1) For a worker with tax elections of Single/0 and 0 allowances for IL: <br> 2) Pay worker for 10 hours for Monday for a job rate of $22.50 per hour. <br> 3) Gross $225, Fed WH $21.68, IL $11.14, Soc sec $13.95, Medicare $3.26 <br> 4) Garn deduction should be $43.74 (lessor of daily portion of 30 times min wage $72, or 25% of disposable $43.74) <br> 5) Pay worker for Tuesday for 10 hrs. at $22.50 and referral bonus of $150. Garn deduction should be $68.27 (lessor of daily portion of 30 times min wage $72, or 25% of disposable $68.27). |
| IRS Levy | 1) For a worker with tax elections of Single/0 and 0 allowances for IL: <br> 2) Pay worker for 10 hours for Monday for a job rate of $22.50 per hour. <br> 3) Gross $225, Fed WH $21.68, IL $11.14, Soc sec $13.95, Medicare $3.26 <br> 4) Garn deduction should be $125.16 (per IRS Pub 1494 for 2022, take home pay for Single/0 daily is $49.81 <br> 5) Pay worker for Tuesday for 10 hrs. at $22.50 and referral bonus of $150. Garn deduction should be $223.25 (should leave take home pay of $49.81) |

As discussed in connection with FIG. 6, the method may take per diem payments into account. Per diem payments can refer to payments made for meals, lodging, or other incidentals paid as a reimbursement to the worker. For example, taxability of per diem payments can be based on the time-based legal (or, e.g., General Services Administration "GSA") limits based on a jurisdiction in which work is performed (and in aspects, updated and downloaded from a government agency). In embodiments, the method may be designed to compare lodging and meals & incidental payments to the GSA limit for the applicable time frame. In embodiments, any value that is entered in excess of a GSA limit is reduced prior to payroll calculation. In embodiments, amounts exceeding the GSA limits are included on a taxable per diem pay element. Note that the payroll system looks at any per diem payments made in a day to determine if the GSA limit is reached. Therefore, the method may not enter per diem on different job orders in an attempt to override taxability constraints.

Note that a geofence as discussed in terms of this disclosure may refer to a dynamically generated area around a worksite defined by an employer-user. In embodiments, the geofence is generated in response to a creation of a shift that will be located at a job site/worksite. For example, when a cannot be retroactively changed without alteration of all the blocks. Therefore, a blockchain can serve as a distributed ledger that records transactions between two parties in a verifiable and immutable manner. Various elements of block as shown and described earlier in FIGS. 1 and 2 such as nonce number, parent hash, hash, Merkle trees are known are not further described. Note that although Merkle trees are presented, note that Verkle trees or other non-Merkle tree hash tree substitutes may be contemplated as appropriate to the blockchain network being utilized.

As shown, computing device 700 may include one or more processors or processor cores 702 and memory 704. In embodiments, memory 704 may be system memory. For the purpose of this application, including the claims, the terms "processor" and "processor cores" may be considered synonymous, unless the context clearly requires otherwise. The processor 702 may include any type of processors, such as a central processing unit CPU, graphics processing unit (GPU), a microprocessor, specialized AI hardware accelerators, and the like. The processor 702 may be implemented as an integrated circuit having multi-cores, e.g., a multi-core microprocessor. The computing device 700 may include mass storage devices 706 (such as diskette, hard drive, volatile memory (e.g., dynamic random-access memory (DRAM), compact disc read-only memory (CD-ROM), digital versatile disk (DVD), and so forth). In general, memory 704 and/or mass storage devices 706 may be temporal and/or persistent storage of any type, including, but not limited to, volatile and non-volatile memory, optical, magnetic, and/or solid state mass storage, and so forth. Volatile memory may include, but is not limited to, static and/or dynamic random-access memory. Non-volatile memory may include, but is not limited to, electrically erasable programmable read-only memory, phase change memory, resistive memory, and so forth. In embodiments, processor 702 is a high performance or server CPU. In some embodiments, computational logic 722 is configured to cause a sequence of events to occur and/or calculations related to triggering an authorization for payment to the worker.

The computing device 700 may further include input/output (I/O) devices 708 (such as a display (e.g., a touchscreen display), keyboard, cursor control, remote control, gaming controller, image capture device, and so forth) and communication interfaces 710 (such as network interface cards, modems, infrared receivers, radio receivers (e.g., Bluetooth), and so forth). The communication interfaces 710 may be used by nodes of the networks discussed above and include communication chips that may be configured to operate the device 700 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 710 may operate in accordance with other wireless protocols in other embodiments.

The above-described computing device 700 elements may be coupled to each other via system bus 712, which may represent one or more buses. In the case of multiple buses, they may be bridged by one or more bus bridges (not shown). Each of these elements may perform its conventional functions known in the art. In particular, memory 704 and mass storage devices 706 may be employed to store a working copy and a permanent copy of the programming instructions for the operation of machine learning engines as described above. The various elements may be implemented by assembler instructions supported by processor(s) 702 or high-level languages that may be compiled into such instructions.

The permanent copy of the programming instructions may be placed into mass storage devices 707 in the factory, or in the field, through, for example, a distribution medium (not shown), such as a compact disc (CD), or through communication interface 610 (from a distribution server (not shown)). That is, one or more distribution media having an implementation of the agent program may be employed to distribute the agent and to program various computing devices.

The number, capability, and/or capacity of the elements 708, 710, 712 may vary, depending on whether computing device 700 is used as a stationary computing device, such as a server computer in a data center, or a mobile computing device, such as a tablet computing device, laptop computer, game console, or smartphone. Their constitutions are otherwise known, and accordingly will not be further described.

In various implementations, the computing device 700 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 701 may be any other electronic device that processes data.

Figure 8:
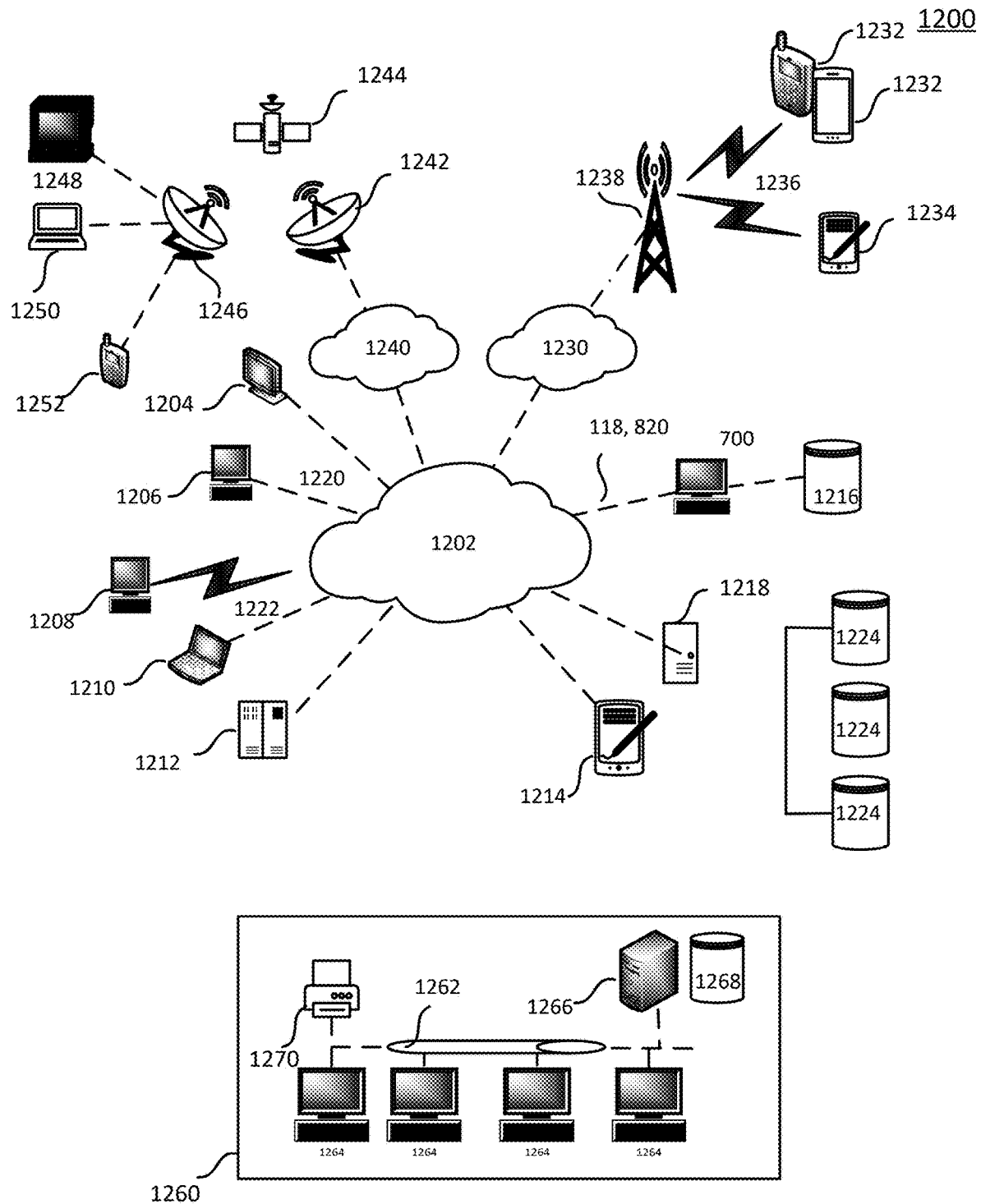
FIG. 8 is an example networked communications system which may be associated with FIGS. 1-7, in accordance with embodiments of the disclosure.

FIG. 8 illustrates a networked communications system 1200 that is depicted in FIGS. 1, 3, 4, and 5 and may include one or more computing device(s) 700. Computing device 700 could connect to network 1202, for example via the Internet or a wide area network (WAN). Input data 1218 and output data 1220 could be communicated to other devices via network 1202. Other terminals, for example, thin client 1204, further processing systems 1206 and 1208, notebook computer 1210, mainframe computer 1212, PDA 1214, pen-based computer 1216, server 1218, etc., can be connected to network 1202. A large variety of other types of terminals or configurations could be utilized. The transfer of information and/or data over network 1202 can be achieved using wired communications means 1220 or wireless communications means 1222. Server 1218 can facilitate the transfer of data between network 1202 and one or more databases 1224. Server 1218 and one or more databases 1224 provide an example of an information source.

Other networks may communicate with network 1202. For example, telecommunications network 1230 could facilitate the transfer of data between network 1202 and mobile or cellular telephone 1232 or a PDA-type device 1234, by utilizing wireless communication means 1236 and receiving/transmitting station 1238. Mobile telephone 1232 devices may load software (client) that communicates with a backend server 1206, 1212, 1218 that operates a backend version of the software. The software client may also execute on other devices 1204, 1206, 1208, and 1210. Client users may come in multiple user classes such as worker users and/or employer users.

Satellite communications network 1240 could communicate with satellite signal receiver 1242 which receives data signals from satellite 1244 which in turn is in remote communication with satellite signal transmitter 1246. Terminals, for example further processing system 1248, notebook computer 1250, or satellite telephone 1252, can thereby communicate with network 1202. A local network 1260, which for example may be a private network, LAN, etc., may also be connected to network 1202. For example, network 1202 may relate to ethernet 1262 which connects terminals 1264, server 1266 which controls the transfer of data to and/or from database 1268, and printer 1270. Various other types of networks could be utilized.

The processing device 700 is adapted to communicate with other terminals, for example further processing systems 1206, 1208, by sending and receiving data, 118, 120, to and from the network 1202, thereby facilitating possible communication with other components of the networked communications system 1200.

Thus, for example, the networks 1202, 1230, 1240 may form part of, or be connected to, the Internet, in which case, the terminals 1206, 1212, 1218, for example, may be web servers, Internet terminals or the like. The networks 1202, 1230, 1240, 1260 may be or form part of other communication networks. Communication channels may include or be routed through one or more wired or wireless communication utilizing IEEE 802.11 protocols, BlueTooth, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a LAN (e.g., 1260), a Wide Area Network (WAN), a public network (e.g. "the Internet"), a private network, a satellite network (e.g., as shown in the Figure), or otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device may include a desktop computer, a laptop computer, a tablet, a phablet, a smartphone, a feature phone, a server computer, high-performance server computer or otherwise. A server computer may be located remotely in a data center or be stored locally.

What is claimed is:

1. A method, comprising:
    receiving by a communications interface of a computing node in a consortium blockchain network, a unique timecard identifier that includes an onboarding identifier of a worker to confirm a worker's identity and wherein the unique timecard identifier is received from a mobile device of the worker, wherein the consortium blockchain network includes at least one of an employer and staffing company and the computing nodes in the consortium blockchain network include or are coupled to persistent storage to serve as decentralized storage for data related to the worker and processors coupled to the computing nodes are used for calculating an automatic payment amount, wherein the consortium blockchain network includes a plurality of permissioned, peer-to-peer computing nodes connected via at least one of a local area network (LAN), a wide area network (WAN), or the internet;
    deploying by a processor of the computing node, a smart contract associated with the onboarding identifier, wherein the smart contract includes a request for verification of employment eligibility including confirmation of identification documents and work history of the worker, wherein the smart contract further includes instructions for, if the worker is verified as eligible for employment, triggering a future automatic payment to the worker for a wage period less than a standard pay period to include allocations for deductions including child support, garnishments, tax withholding, or wage laws, if the allocations apply to the worker and based at least in part on the worker's identity or location, wherein the consortium blockchain network includes organizations that provide or facilitate jobs or employment for the worker, wherein the smart contract includes a set of entries including at least a plurality of entries associated with a first public key related to a first account of the worker, a second public key related to a second account of an intermediary entity, and a third public key related to a third account of an approving entity;
    requesting by the processor from other computing nodes via the smart contract, verification of the worker's identity or data to calculate the automatic payment amount if the worker is to or has worked one or more shifts, and if the data is not returned to the computing node, requesting the data from an oracle, wherein the oracle is a device, entity, or third party service connected to an edge network in an external world, wherein the edge network includes a processing server communicatively coupled to one or more external databases that store jurisdictional rates, garnishments, bonuses, tax rates, or wage laws as related to the worker, a job site, or work eligibility and work history data of the worker, wherein the processing server is to identify a network address outside of the consortium blockchain that is associated with the unique timecard identifier in order to request by the processing server, the data;
    after receiving the data from the other computing nodes or from the oracle, confirming, by the computing node, the worker's identity and worker eligibility to a requesting party or payment to the worker after a shift by the worker has been completed;
    in response to confirming payment to the worker if the shift has been completed, causing, by submitting a transaction from the computing node to the consortium blockchain network, the generation of a new block in a blockchain ledger, wherein the blockchain ledger includes an ordered set of blocks, wherein each block includes at least a timestamp, a header, and a plurality of transaction values on the blockchain wherein the generation of the new block includes:
    (i) hashing a header of a previous block to generate a new header; and
    (ii) generating the new block to include at least the new header and a new value derived from an authorization value associated with the payment to the worker.

2. The method of claim 1, wherein the unique timecard identifier includes a check-in time or a check-out time of the worker at a job site.

3. The method of claim 2, wherein a value of the check-in or check-out data is triggered in part by a geofencing location of the worker at the job site.

4. The method of claim 1, wherein payment to the worker is authorized through a card payment vendor or other similar payment service.

5. The method of claim 1, wherein data related to the worker's identity and work history is stored in a persistent storage of members of the consortium blockchain.

6. The method of claim 1, wherein the smart contract includes payment amounts related to guidelines for the job site and the worker.

7. The method of claim 1, wherein actions triggered by the smart contract include execution of instructions for confirmation of the worker's identity and work history to be sent to the requesting party.

8. The method of claim 1, wherein the unique timecard identifier is received from a mobile device of the worker located at a job site.

9. The method of claim 1, wherein the onboarding identifier assists in verifying the worker's identity without being associated with a shift or payment for a shift.

10. The method of claim 1, wherein the unique timecard identifier includes a request for payment by the worker and upon fulfillment of certain conditions in the smart contract, the worker is automatically paid in cryptocurrency.

11. The method of claim 1, wherein the intermediary entity and the approving entity are the same entity.

12. A system, comprising:
a memory;
a communications interface; and
a processor, operably coupled to the memory and the communications interface, wherein the processor is configured to:
cause the communications interface to receive from a computing node of a consortium blockchain network, a unique timecard identifier that includes an onboarding identifier to confirm a worker's identity and wherein the unique timecard identifier is received from a mobile device of the worker, wherein the consortium blockchain network includes at least one or more of an employer and staffing company and the nodes in the consortium blockchain network include or are coupled to persistent storage to serve as decentralized storage for data related to the worker, wherein the consortium blockchain includes a plurality of permissioned, peer-to-peer computing nodes connected via at least one of a local area network (LAN), a wide area network (WAN), or the internet;
after receipt of the unique timecard identifier, deploy a smart contract associated with the onboarding identifier, wherein the smart contract includes a request for first data related to verified identification documents and work history of the worker and wherein the smart contract further includes instructions for, if the worker is verified as eligible for employment, triggering a future automatic payment to the worker for a single day's wage that include allocations for deductions including child support, garnishments, tax withholdings, or wage laws, if the deductions apply to the worker, wherein the smart contract includes a set of entries including at least a plurality of entries associated with a first public key related to a first account of the worker, a second public key related to a second account of an intermediary entity, and a third public key related to a third account of an approving entity;
receive from other computing nodes, via the communications interface, per the smart contract, the first data for verifying employment, or second data to calculate an amount of the automatic payment if the worker is to or has worked one or more shifts, and if the second data is not returned to the computing node, request the second data from an oracle coupled to a processing server included in an edge network and wherein the edge network is communicatively coupled to a plurality of databases storing jurisdictional rates, garnishments, bonuses, tax rates, or wage laws as related to the worker and a job site; and the processor server identifies a network address outside of the consortium blockchain that is associated with the unique timecard identifier in order to request by the processing server, the data; and
after receipt of the first data or the second data via the communications interface, respectively confirm by the computing node, the worker's employment eligibility or authorization of the automatic payment to the worker; and
cause, by submitting a transaction via the communications network to the consortium blockchain network, the generation of a new block in a blockchain ledger, wherein the blockchain ledger includes an ordered set of blocks, wherein each block includes at least a timestamp, a header, and a plurality of transaction values on the blockchain wherein the generation of the new block includes;
(i) hashing a header of a previous block to generate a new header; and
(ii) generating the new block to include at least the new header and a new value derived from an authorization value associated with the payment to the worker if payment is authorized.

13. The system of claim 12, wherein the unique timecard identifier includes a check-in time or a check-out time of the worker at the job site.

14. The system of claim 12, wherein the smart contract includes payment amounts related to guidelines for the job site and the worker as set forth in the smart contract.

15. A non-transitory machine-accessible storage medium that stores instructions that, when executed by a machine, will cause the machine to perform operations comprising:
receive from a computing node of a consortium blockchain network, a unique timecard identifier that includes an onboarding identifier to confirm a worker's identity and wherein the unique timecard identifier is received from a mobile device of the worker, wherein the consortium blockchain network includes at least one or more of an employer and staffing company and computing nodes in the consortium blockchain network include or are coupled to persistent storage to serve as decentralized storage for data related to the worker and the computing nodes are used for calculating an automatic payment amount, wherein the consortium blockchain network includes at least a plurality of permissioned, peer-to-peer computing nodes connected via at least one of a local area network (LAN), a wide area network (WAN), or the internet;
after receipt of the unique timecard identifier, deploy a digital contract associated with the onboarding identifier, wherein the digital contract includes a request for first data related to verified identification documents and work history of the worker and wherein the digital contract further includes instructions for, if the worker is verified as eligible for employment, triggering a future automatic payment to the worker for a single day's wage or a time period less than a standard pay period, and that includes allocations for deductions including child support, garnishments, taxes, or wage laws, if the allocations apply to the worker, wherein the digital contract includes a set of entries including at least a plurality of entries associated with a first public key related to a first account of the worker, a second public key related to a second account of an intermediary entity, and a third public key related to a third account of an approving entity;

receive from other computing nodes, via a communications interface, the first data for verifying employment, or second data to calculate an amount of the automatic payment if the worker is to or has worked one or more shifts, and if the second data is not returned to the computing node, request the second data from an oracle coupled to a processing server included in an edge network and wherein the edge network is communicatively coupled to a plurality of databases storing jurisdictional rates, garnishments, bonuses, tax rates, or wage laws as related to the worker and a job site; and the processor server identifies a network address outside of the consortium blockchain that is associated with the unique timecard identifier in order to request by the processing server, the data; and after receipt of the first data or the second data via the communications interface, respectively confirm the worker's employment eligibility or authorize the automatic payment to the worker; and cause, the generation of a new block in a blockchain ledger of consortium blockchain network, wherein the blockchain ledger includes an ordered set of blocks, wherein each block incudes at least a timestamp, a header, and a plurality of transaction values on the blockchain wherein the generation of the new block includes:

(i) hashing a header of a previous block to generate a new header; and (ii) generating the new block to include at least the new header and a new value derived from an authorization value associated with the payment to the worker, if payment is authorized to the worker.

16. The non-transitory machine-accessible storage medium of claim 15, wherein actions triggered by the digital contract include execution of instructions for confirmation of the worker's identity and work history to be sent to a requesting party and wherein the requesting party is the approving entity.

17. The non-transitory machine-accessible storage medium of claim 15, wherein payment to the worker is authorized through a card payment vendor or other similar payment service.

18. The non-transitory machine-accessible storage medium of claim 15, wherein the onboarding identifier helps to verify the worker's identity without being associated with a shift or payment for a shift.

* * * * *